Oct. 6, 1964 A. HEETMAN 3,152,258

ELECTRO-OPTICAL SWITCHING DEVICE

Filed July 21, 1960 4 Sheets-Sheet 1

INVENTOR

*Alphonsus Heetman.*

BY

*Frank R. Trifari*

AGENT

INVENTOR
Alphonsus Heetman.
BY
Frank R. Jerfani
AGENT

INVENTOR
*Alphonsus Heetman*
BY
*Frank R. Jifani*
AGENT

Oct. 6, 1964 A. HEETMAN 3,152,258

ELECTRO-OPTICAL SWITCHING DEVICE

Filed July 21, 1960 4 Sheets-Sheet 4

INVENTOR
*Alphonsus Heetman.*
BY
*Frank R. Jifari*
AGENT

United States Patent Office 3,152,258

Patented Oct. 6, 1964

3,152,258
ELECTRO-OPTICAL SWITCHING DEVICE

Alphonsus Heetman, Hilversum, Netherlands, assignor to North American Philips Company, Inc., New York, N.Y., a corporation of Delaware Filed July 21, 1960, Ser. No. 44,503
Claims priority, application Netherlands July 24, 1959
4 Claims. (Cl. 250—213)

This invention relates to electronic switches of the type having, in lieu of a physical arrangement, a contact in the form of a radiation-sensitive resistor which receives either radiation of a comparatively high intensity or radiation of a comparatively low intensity (as the case may be no radiation) from a radiation source, the switch thus being in a state of a comparatively low resistance (switch closed) or in a state of a comparatively high resistance (switch open). Radiation-sensitive resistors, more particularly photo-sensitive resistors having a resistance very much higher in the non-exposed state (about $10^3$ times) than in the exposed state, are referred to as photo-conductors and known inter alia from an article by N. A. de Gier, W. van Gool and J. G. van Santen (Photoresistors of Pressed and Sintered Cadmium Sulphide) (Philips Technical Review, 20 (1958), pages 277–287). There are also resistors having a resistance which decreases if, in the state radiated with ordinary white light, they are radiated with additional light of a given wave-length. However, the invention is independent of the kind of the radiation and of the fact whether this radiation decreases or increases the resistance. The use of photo-conductors as switches has been described inter alia in an article by A. Bramley and J. E. Rosenthal, Photo-Conductive Switching Devices (Proceedings of the Symposium on the role of solid state phenomena in electric circuits, vol. VII, April 1957, pages 298 to 301, distributed by Interscience Publishers, New York).

An object of the invention is to improve said switches and more particularly their control so that they can be used in large switching matrices controlled by twofold or multifold coincidence.

The invention is characterized in that the source of radiation is also coupled through its radiation to a radiation-sensitive member controlling the intensity of the radiation emitted by the radiation source so that an increase in the intensity of the radiation striking the radiation-sensitive member causes an increased intensity of the radiation emitted by the radiation source so that the radiation source and the radiation-sensitive member together constitute a bistable element which emits radiation of a comparatively high intensity in one stable condition and which emits radiation of a comparatively low intensity (possibly no radiation) in its other stable condition. It is particularly practical to use for the bistable element a series-combination of an electric source of light and a photo-conductor which is coupled thereto by optical means. Such a bistable element is known per se from an article by F. H. Nicoll and B. Kazan (Large Area High-Current Photoconductive Cells Using Cadmium Sulphide Powder) (Journal of the Optical Society of America, 45 (1955), pages 647 to 650). The light source used may advantageously be an electroluminescent element.

In order that the invention may be readily carried into effect, several embodiments thereof will now be described in detail, by way of example, with reference to the accompanying diagrammatic drawings, in which:

FIG. 1 shows the symbol used for an electroluminescent element, and FIG. 2 shows the symbol used for a photoconductor.

Figure 1:
FIGS. 1 to 5 show the symbols used for several switching elements.
Figure 2:
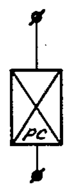
Figure 3:
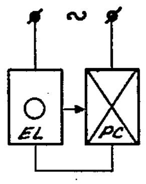
Figure 4:
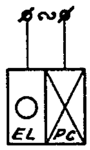
Figure 5:

FIG. 3 shows, with the use of these symbols, the series-combination of an electroluminescent element and a photoconductor, in which the electroluminescent element is optically coupled to the photoconductor. This coupling, which is indicated by an arrow in FIG. 3, is unilateral, that is to say, there is no optical back-coupling from the photoconductor to the electroluminescent element. The circuit shown in FIG. 3, which may be indicated in abridged form by the symbol shown in FIG. 4 or FIG. 5, is bistable when energized by an alternating voltage source of sufficiently high value and frequency and is already known per se from an article by T. B. Tomlinson (Principles of the Light Amplifier and Allied Devices) (Journal British Institute Rad. Eng., 1957, No. 3, pages 141 to 154). In one stable condition, referred to as the luminescent or lit condition, the series-combination is traversed by alternating current so that the electroluminescent element luminesces and irradiates the photoconductor which thus assumes a low resistance which permits alternating current to flow through the series-combination. In the other stable condition, referred to as the non-luminescent or dark condition, the series-combination is substantially not traversed by alternating current so that the electroluminescent element does not become luminescent and hence does not irradiate the photoconductor which thus assumes a high resistance which substantially prevents alternating current from flowing through the series-combination. The bistable element may be brought from the non-luminescent state into the luminescent state by either setting up a momentary alternating-voltage pulse across the electroluminescent element, or throwing a momentary light pulse onto the photoconductor. In the former case, the electroluminescent element luminesces so that the photoconductor assumes its low resistance and alternating current starts to flow through the series-combination, which alternating current maintains the electroluminescent element in the luminescent state. In the latter case, the same happens since the photoresistance assumes a low resistance due to its being irradiated from outside. The bistable element may be brought from the luminescent state into the non-luminescent state by momentarily interrupting its supply circuit.

Figure 6:
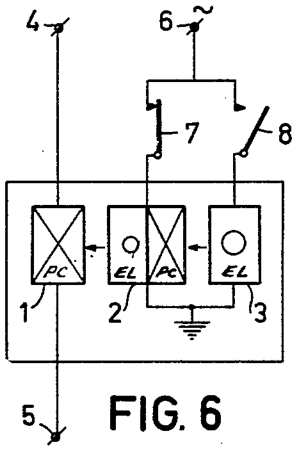
FIGS. 6 to 8 show three embodiments of the invention.

FIG. 6 shows a first example of an electronic switch according to the invention. In this figure, a photoconductor is indicated by 1, a bistable element of the kind referred to above by 2, and an electroluminescent element by 3. The supply circuit for the bistable element 2 includes a switch 7, which is closed in the rest condition, the supply circuit for the electroluminescent element 3 including a switch 8 which is open in the rest condition. The photoconductor 1 constitutes the contact of the switch and is connected to terminals 4 and 5. The common supply terminal for the bistable element 2 and the electroluminescent element 3 is indicated by 6.

The circuit operates as follows. Let it be assumed that the bistable element 2 is in the non-luminescent state. In this case, the photoconductor 1 is not illuminated and thus has a high resistance, that is to say, the contact of the electronic switch is open. By momentarily closing the switch 8, the photoconductor of the bistable element 2 receives a light pulse which brings this element into the luminescent condition. The photoconductor 1 thus assumes its low resistance, that is to say, the contact of the electronic switch is closed. By momentarily opening the switch 7, the bistable element is restored to the non-luminescent state and the contact of the electronic switch is opened again. This switch, as will appear hereinafter, has the drawback of being unsuitable for control in coincidence, at least in switching matrices of large size.

Figure 7:
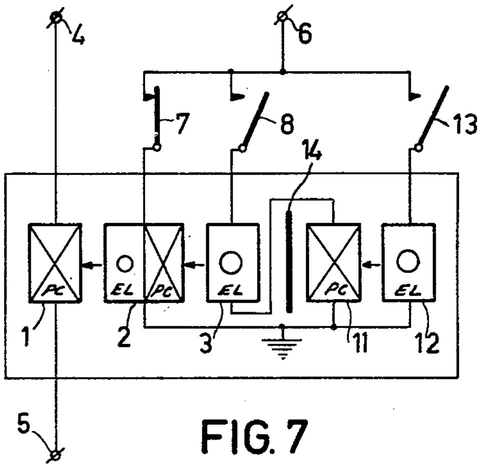

FIG. 7 shows the diagram of an electronic switch in which this drawback is avoided. It differs from the circuit shown in FIG. 6 in that the light source 3 is now connected in series with a photoconductor 11 which can be illuminated by a further light source 12. As before, the light sources 3 and 12 are preferably electroluminescent elements. The electroluminescent element 3 is optically insulated from the photoconductor 11 by means of a screen 14, this screen also optically insulating the electroluminescent element 12 from the photoconductor of the bistable element 2. The supply circuit for the electroluminescent element 12 includes a switch 13 which is open in the rest condition.

The bistable element 2 can be brought from the non-luminescent state into the luminescent state only by momentarily closing the switches 8 and 13 at the same time, since the electroluminescent element 12 thus momentarily luminesces, due to which the photoconductor 11 momentarily assumes a low resistance and the electroluminescent element 3 momentarily luminesces. When the switch 18 is open, the electroluminescent element 3 cannot become luminescent due to its supply circuit being interrupted, and when the switch 13 is open, the electroluminescent element 3 cannot become luminescent since the photoresistor 11, which is connected in series therewith, is then not illuminated by the electroluminescent element 12 and hence assumes a high resistance.

Figures 8, 9:
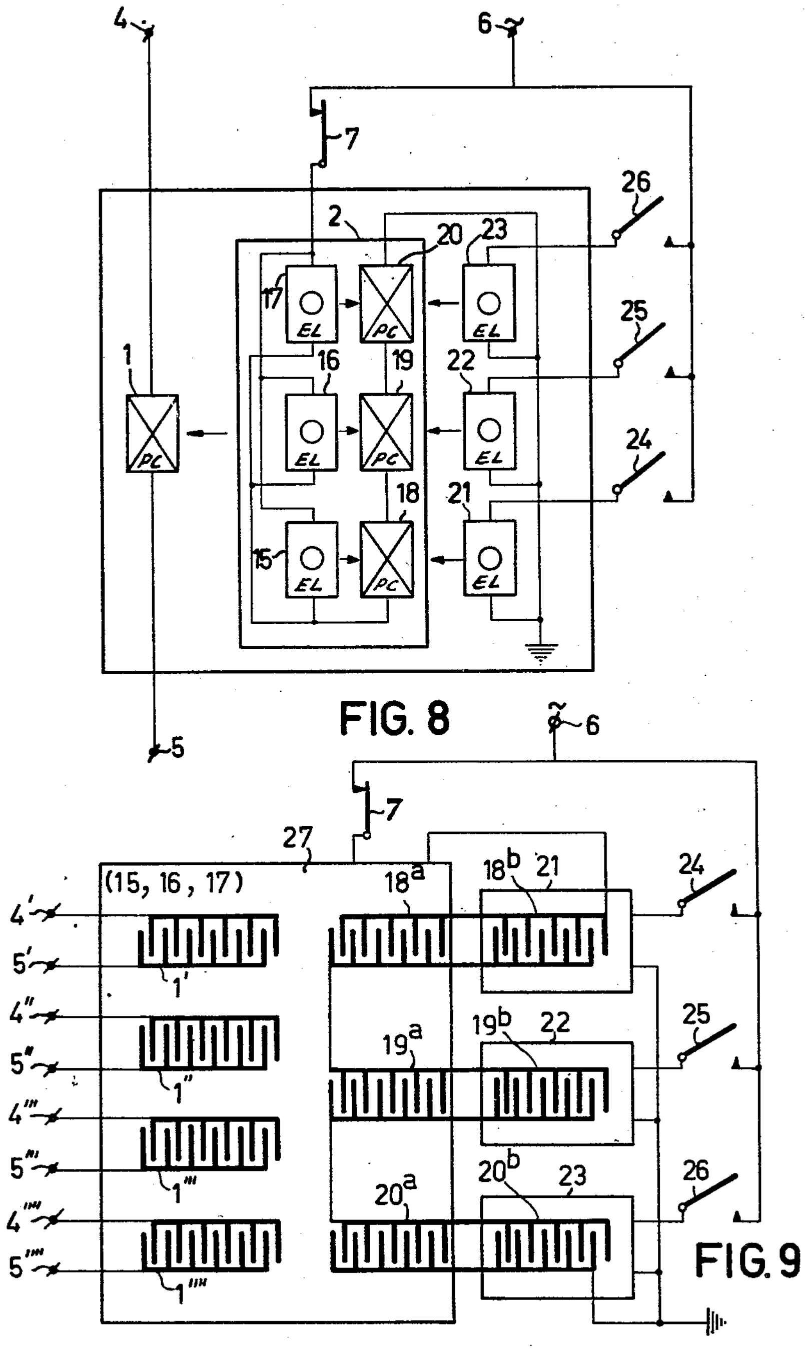
FIG. 9 shows a modification of the FIG. 8 embodiment.

FIG. 8 shows the diagram of an electronic switch which can be controlled in threefold coincidence. It differs from the circuit shown in FIG. 6 in that the electrolumiscent element of the bistable element 2 is replaced by three electroluminescent elements 15, 16, 17 connected in parallel, and the photoconductor of the bistable element is replaced by three photoconductors 18, 19, 20 connected in series, and that the electroluminescent element 3 is replaced by three electroluminescent elements 21, 22, 23. These electroluminescent elements are individually coupled to the photoconductors 18, 19, 20 in the manner indicated by arrows, while there are no couplings other than those indicated by the arrows, so that the electroluminescent element 23, for example, is not optically coupled to the photoconductor 1, nor to the photoconductors 18 and 19. The electroluminescent elements 21, 22, 23 can be individually energized via switches 24, 25, 26 which are open in the rest condition. The three electroluminescent elements 15, 16, 17 constitute, together with the three photoconductors 18, 19, 20 a bistable element. This bistable element can be brought from the non-luminescent state into the luminescent state only by momentarily closing the three switches 24, 25, 26 at the same time. In fact, all three electroluminescent elements 21, 22, 23 then momentarily become luminescent so that all three photoconductors 18, 19, 20 assume low resistances and alternating current can flow through the circuit 17, 16, 15, 18, 19, 20. However, if one of the three switches 24, 25, 26 remains open, one of the photoconductors 18, 19, 20 retains its high resistance and alternating current cannot or substantially not flow through the circuit 17, 16, 15, 18, 19, 20. It will otherwise be evident that the circuit may also be adapted to a coincidence which is twofold or more than threefold.

FIG. 9 shows a particularly practical embodiment of the circuit of FIG. 8. The three electroluminescent elements connected in parallel are now constituted by a single luminescent plate 27. This plate is optically coupled to four photoconductors 1', 1'', 1''', 1'''' provided thereon, each of which fulfils the function of the photoconductor 1 of FIG. 8. Thus, in the electronic switch shown in FIG. 9, in each case four contacts are opened or closed at the same time, a thing which is of great importance in, for example, automatic telephone circuits. The photoconductors 1', 1'', 1''', 1'''' are preferably of the kind described in the article of the Philips Technical Review referred to above. The electroluminescent plate is also coupled by optical means to the three photoconductors 18, 19, 20 connected in series, which three photoconductors as a whole are connected in series with the electroluminescent plate 27, the photoconductors 18, 19, 20 comprise portions 18*a*, 19*a*, 20*a* respectively, each optically coupled to the electro-luminescent element 27, and portions 18*b*, 19*b*, 20*b* respectively, which are optically coupled to electroluminescent elements 21, 22, 23 respectively, the latter electroluminescent elements corresponding to the equally numbered electroluminescent elements of the circuit shown in FIG. 8. The supply circuit for the series-combination of the electroluminescent plate 27 and the photoconductors 18, 19, 20 includes the switch 7, which is closed in the reset condition, the supply circuits for the electroluminescent plates 21, 22, 23 including the switches 24, 25, 26 respectively, which are open in the rest condition. It can readily be appreciated that the device shown in FIG. 9 is equivalent, from a viewpoint of switching technique, to the circuit shown in FIG. 8. The embodiment shown in FIG. 9 affords the advantage that it is particularly suited to extrusion techniques and printed circuit techniques. The electroluminescent elements 27, 21, 22, 23 may, of course, be provided on portions of the same plate. The portions 18*a*, 18*b* and 19*a*, 19*b* and 20*a*, 20*b* are connected pairwise in parallel.

Figure 10:
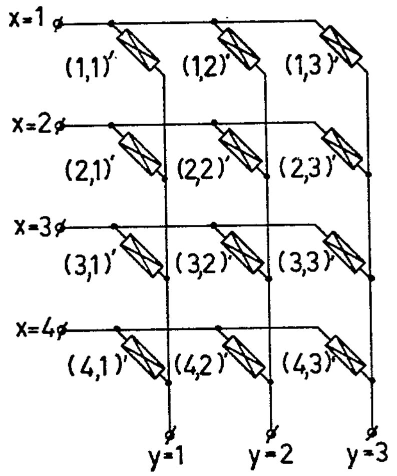
FIGS. 10 to 12 show the use of the electronic switch of FIG. 6 in a switching matrix.
Figure 11:
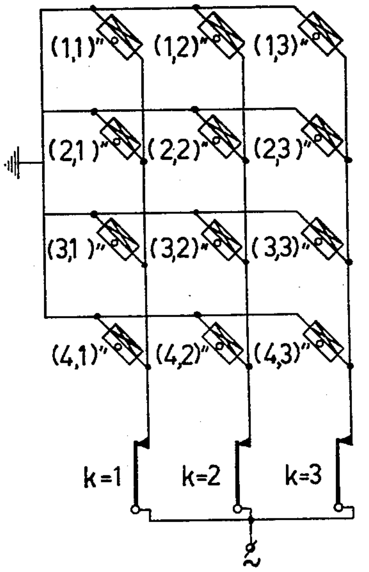
Figure 12:
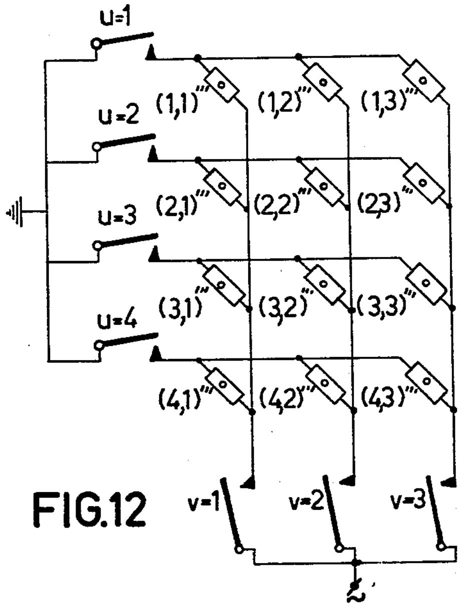

FIGS. 10, 11 and 12 show the use of the electronic switch of FIG. 6 in a switching matrix, which is to be understood herein to mean a network having a plurality of inlets or inputs $x=i$ ($i=1, 2, \ldots m$) (in FIG. 10, $m=4$) and a plurality of outlets or outputs $y=j$ ($j=1, 2, \ldots n$) in FIG. 10, $n=3$), in which each inlet may be coupled or not coupled (electrically or magnetically) via a coupling element to each outlet. The coupling elements are also referred to as the crossings of the switching matrix. The number of inlets may, but need not, be equal to the number of the outlets. If these two numbers are different, the entries (collective word for inlets and outlets) of the switching matrix may be identified so that it has more inlets than outlets, so that $m>n$. In this case the switching matrix is said to have concentration. The switching matrix shown in FIG. 10 thus has concentration. A single switch can be considered as a switching matrix having only one crossing.

The crossings connected to the same inlet jointly constitute a row of crossings of the switching matrix and the crossings connected to the same outlet jointly constitute a column of crossings of the switching matrix.

FIG. 10 shows a switching matrix for which $m=4$, $n=3$ and the crossings of which are photoconductors. The crossing coupling the inlet $x=i$ and to the outlet $y=j$ is indicated by the symbol $(i, j)'$. Each crossing corresponds to the photoconductor 1 of the switch shown in FIG. 6.

FIG. 11 shows the circuit of the bistable elements 2 of the electronic switch of FIG. 6 in the switching matrix. The bistable element controlling the crossing $(i, j)'$ is indicated in this figure by the symbol $(i, j)''$. The bistable elements $(1, j)''$, $(2, j)''$, $(3, j)''$, $(4, j)''$ are connected in parallel via a switch $k=j$ which is closed in the rest condition and which fulfils the function of the switch 7 of FIG. 6.

FIG. 12 shows the circuit of the electroluminescent elements 3 of the electronic switch shown in FIG. 6. The electroluminescent element controlling the bistable element $(i, j)''$ is indicated in this figure by the symbol $(i, j)'''$. The electroluminescent elements $(i, 1)'''$, $(i, 2)'''$, $(i, 3)'''$ are connected in parallel and connected to earth via a switch $u=i$ which is open in the rest condition. The electroluminescent elements $(1, j)'''$, $(2, j)'''$, $(3, j)'''$, $(4, j)'''$ are likewise parallel to a switch $v=j$ which is open in the rest condition and the other terminal of which is connected to the alternating-voltage source.

The circuit operates as follows. Let it be assumed that the inlet $x=1$ is desired to be coupled to the outlet $y=2$. In this case, the switches $u=1$, $v=2$ are momentarily closed so that the electroluminescent element $(1, 2)'''$ momentarily luminesces. This causes the bistable element $(1, 2)''$ to become luminescent so that the photoconductor $(1, 2)'$ assumes its low resistance and the desired coupling is established. The coupling is interrupted by momentarily opening the switch $k=2$. True, the supply circuits for the bistable elements $(1, 2)''$, $(2, 2)''$, $(3, 2)''$, $(4, 2)''$ are thus interrupted, but of these bistable elements only the bistable element $(1, 2)''$ is in the luminescent state. The latter is a result of the fact that an outlet (that is to say the outlet $y=2$) can be connected to only one inlet (that is to say the inlet $x=1$) at a time. Opening the switch $k=2$ thus extinguishes the bistable element $(1, 2)''$, but does not influence the bistable elements $(2, 2)''$, $(3, 2)''$, $(4, 2)''$.

This circuit has the drawback that closure of the switches $u=1$, $v=2$ has the effect that not only the electroluminescent element $(1, 2)'''$, but also all the other electroluminescent elements become live and hence luminesce to a greater or lesser extent. Let us consider, for example, the electroluminescent element $(1, 3)'''$. This element can be energized via the electroluminescent elements $(2, 2)'''$, $(2, 3)'''$, $(1, 3)'''$, via the electroluminescent elements $(3, 2)'''$, $(3, 3)'''$, $(1, 3)'''$ and via the electroluminescent elements $(4, 2)'''$, $(4, 3)'''$, $(1, 3)'''$. Similar remarks also apply to all the other electroluminescent elements. However, it appears that each of these other electroluminescent elements is energized in series with other electroluminescent elements and hence luminesces less strongly than the selected electroluminescent element $(1, 2)'''$. Consequently, the circuit will operate satisfactorily only if the bistable elements $(i, j)''$ are so proportioned that they do not respond to the one of these other luminescent elements which luminesces most. An advantageous factor in this connection is the greatly non-linear characteristic of the luminescent elements, which effect may be enhanced, if desired, by connecting each electroluminescent element in series with a voltage-dependent resistor (VDR). However, in switching matrices of large size, each electroluminescent element is energized due to closure of the switches $u=1$ and $v=2$ along so many parallel paths that the electroluminescent elements which have not been selected luminesce only to a smaller extent than the electroluminescent element selected, so that the circuit shown in FIG. 12 does not function well. This drawback may be obviated by replacing the electroluminescent elements $(i, j)'''$ by light sources fed on direct current, for example incandescent lamps, which may be uncoupled in known manner by means of diodes. However, this solution is little attractive in technical and economical repect. Another solution which is more attractive in both technical and economic respect is obtained by building up the switching matrix from electronic switches of the type shown in FIG. 7.

Figure 13:
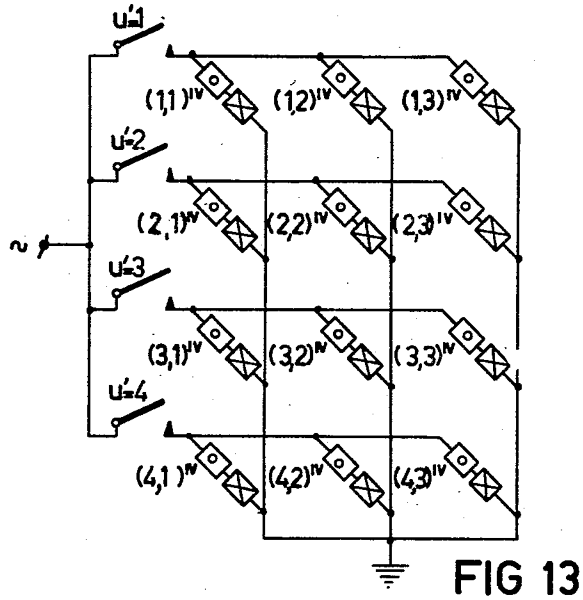
FIGS. 13 and 14 show the use of the switch of FIG. 7 in a switching matrix.
Figure 14:
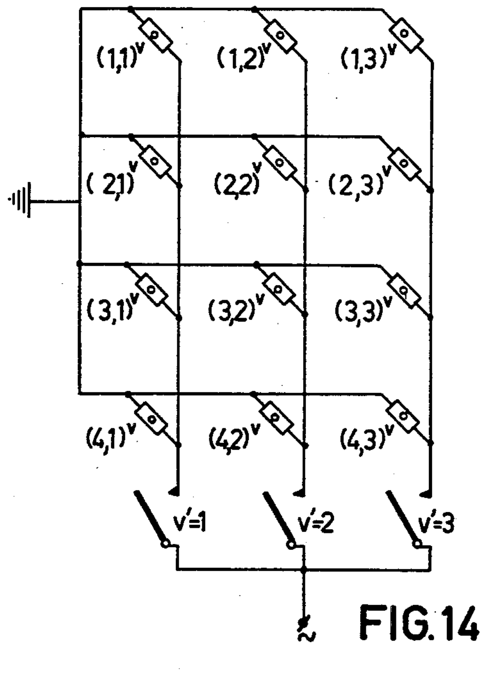

FIG. 13 shows in what manner the series-combinations 3, 11 (FIG. 7) are connected and FIG. 14 shows in what manner the electroluminescent elements 12 (FIG. 7) are connected. The series-combination 3, 11, which controls the bistable element $(i, j)''$, is indicated by the symbol $(i, j)^{iv}$ in FIG. 13 and the electroluminescent element 12, which controls the photoconductor of the series-combination $(i, j)^{iv}$, is indicated by the symbol $(i, j)^{v}$ in FIG. 14. The series-combinations $(i, 1)^{iv}$, $(i, 2)^{iv}$, $(i, 3)^{iv}$ are connected in parallel via a switch $u'=i$ (FIG. 13) and the electroluminescent elements $(1, j)^{v}$, $(2, j)^{v}$, $(3, j)^{v}$, $(4, j)^{v}$ are connected in parallel via a switch $v'=j$ (FIG. 14).

When the switch $v'=j$ is momentarily closed, the electroluminescent elements $(1, j)^{v}$, $(2, j)^{v}$, $(3, j)^{v}$, $(4, j)^{v}$ momentarily become luminescent. If, at the same time, the switch $u'=i$ is momentarily closed, the series-combinations $(i, 1)^{iv}$, $(i, 2)^{iv}$, $(i, 3)^{iv}$ are momentarily in the state in which they can be rendered luminescent. However, since the series-combination $(i, j)^{iv}$ only is illuminated, only this series-combination momentarily luminesces so that the bistable element $(i, j)''$ (FIG. 11) is again brought into the luminescent state and the photoconductor $(i, j)'$ (FIG. 10) assumes its low resistance. Consequently, the inlet $x=i$ is coupled to the outlet $y=j$.

In conclusion, it will be evident that it is similarly possible, with the use of electronic switches of the types shown in FIGS. 8 and 9, to build up switching matrices which are controlled in twofold or multifold coincidence.

What is claimed is:

1. An electro-optical device comprising a first radiation-responsive, variable-impedance switch element, connections to said switch element to be connected together when the latter is irradiated, first plural, parallel-connected, voltage-responsive radiation sources and second plural, radiation-responsive, serially-connected, variable-impedance elements each optically coupled to one of the first radiation sources, means electrically connecting together in series the first radiation sources and the second variable-impedance elements to form plural regenerative bistable combinations whereby the first radiation sources can generate only a very high intensity level of radiation and a very low intensity level of radiation, said first variable-impedance element being optically coupled to the first radiation sources, second plural radiation sources each optically coupled to one of the second variable impedance elements, means for applying and removing a potential across the first sources and the second elements, and switch means for applying and removing a potential across each of the second sources whereby the switch means must coincidentally apply their potentials to irradiate the said switch element.

2. A device as set forth in claim 1 wherein the first radiation sources comprise a single planar electroluminescent element, the second radiation sources each comprise electroluminescent regions, and the second variable-impedance elements each comprises separate sections, connected in parallel, each associated with the planar electroluminescent element and one of the electroluminescent regions.

3. An electro-optical switching system comprising a first plurality of conductors and a second plurality of conductors defining with the former an array of crossings, a plurality of first, radiation-responsive, photo-conductive switch elements each associated with a crossing and connected to a conductor of the first plurality and a conductor of the second plurality defining the associated crossing and adapted when irradiated to connect together the said conductors; and bistable means for irradiating selected ones of the first photo-conductive elements and exhibiting the property of being either highly radiating or substantially non-radiating, said bistable means comprising an array each operating region of which comprises a series-connected second radiation-responsive photoconductive element optically coupled to a first voltage-responsive, radiation-producing element, and a second voltage-responsive, radiation-producing element optically coupled to the second photo-conductive element, each first photo-conductive switch element being optically coupled to a first radiation-producing element of the said array; means for applying and removing a potential across each of the series-connected second photo-conductive and first radiation-producing elements, and means for applying a potential across selected ones of the second radiation-producing elements.

4. A switching system as set forth in claim 3 wherein the applying and removing means includes a normally-closed switch connected in series with each of the series-connected elements, and wherein the last-named applying means include normally-open switches.

References Cited in the file of this patent

UNITED STATES PATENTS

| | | |
|---|---|---|
| 2,874,308 | Livingston | Feb. 17, 1959 |
| 2,885,564 | Marshall | May 5, 1959 |
| 2,895,054 | Loebner | July 4, 1959 |
| 2,907,001 | Loebner | Sept. 29, 1959 |
| 2,951,970 | Matarese | Sept. 6, 1960 |
| 2,954,476 | Ghandi | Sept. 27, 1960 |
| 2,964,638 | Hanlet | Dec. 13, 1960 |
| 2,998,530 | Marshall | Aug. 29, 1961 |
| 3,010,025 | Bramley et al. | Nov. 21, 1961 |
| 3,037,189 | Barrett et al. | May 29, 1962 |
| 3,041,490 | Rajchman et al. | June 26, 1962 |
| 3,078,373 | Wittenberg | Feb. 19, 1963 |

UNITED STATES PATENT OFFICE

CERTIFICATE OF CORRECTION

Patent No. 3,152,258 October 6, 1964

Alphonsus Heetman

It is hereby certified that error appears in the above numbered patent requiring correction and that the said Letters Patent should read as corrected below.

Column 3, line 23, for "18" read -- 8 --; column 4, line 17, for "reset" read -- rest --.

Signed and sealed this 16th day of March 1965.

(SEAL)
Attest:

ERNEST W. SWIDER
Attesting Officer

EDWARD J. BRENNER
Commissioner of Patents